Figure 6:
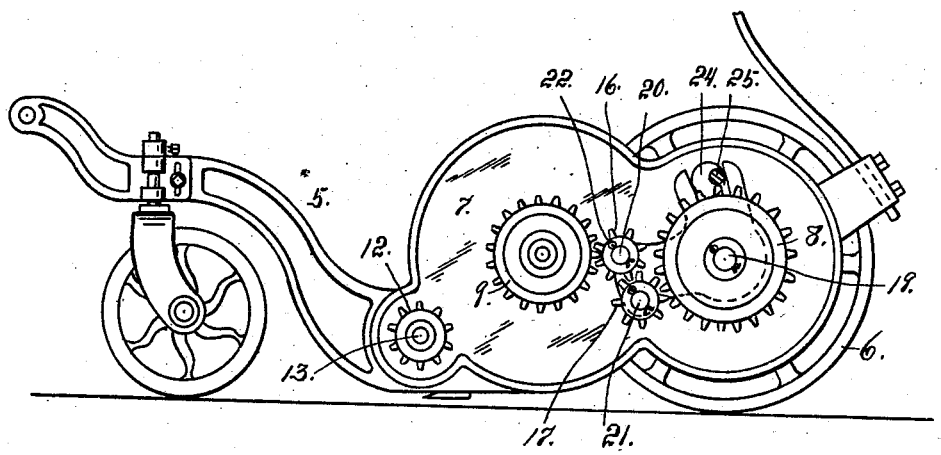

No. 859,881. PATENTED JULY 9, 1907.
A. HILL.
LAWN MOWER.
APPLICATION FILED OCT. 14, 1905.
3 SHEETS—SHEET 1.
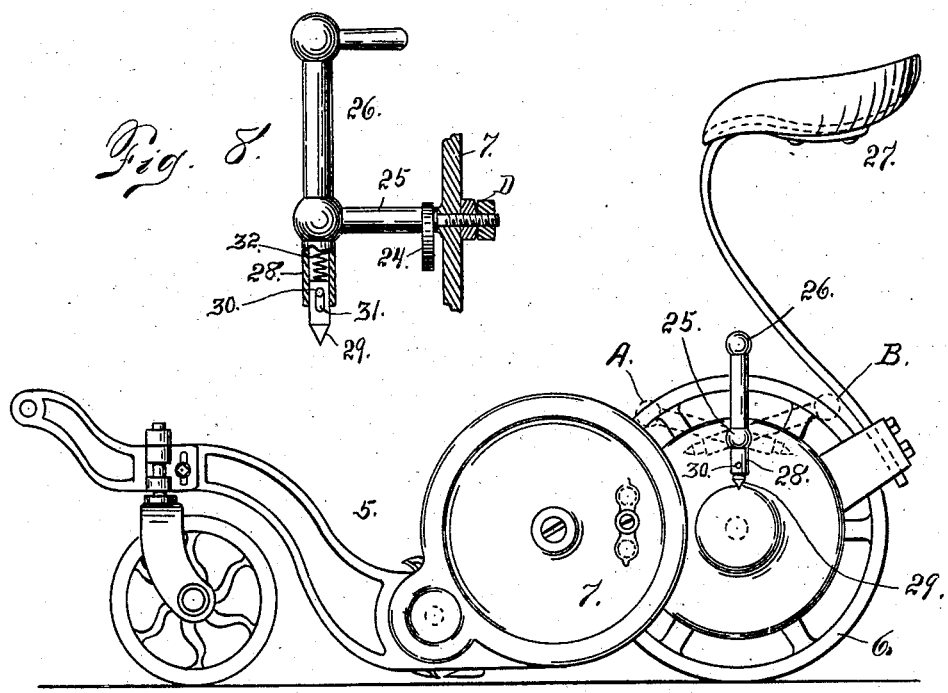
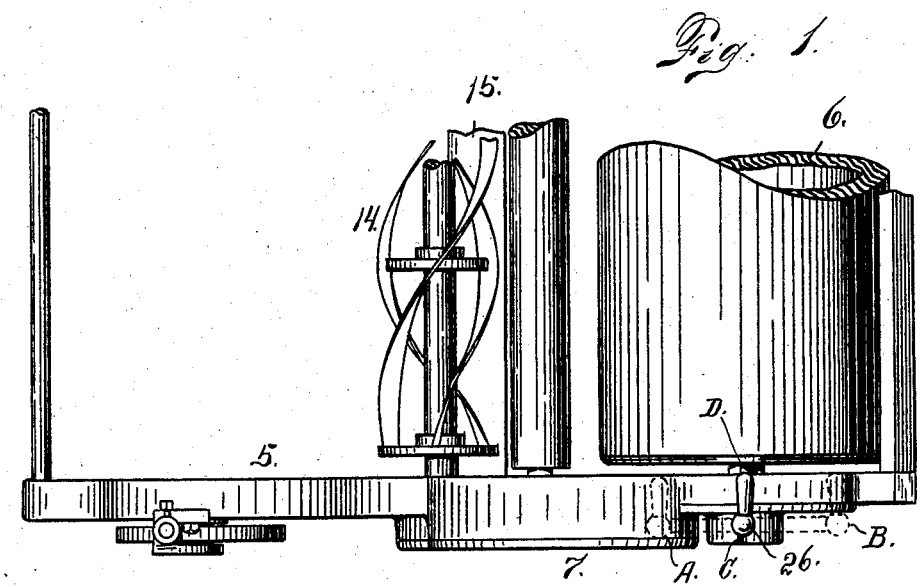
Witnesses
Otto E. Haddick
Dena Nelson
Inventor
A. Hill
by A. M. Imes
Attorney No. 859,881. PATENTED JULY 9, 1907.
A. HILL.
LAWN MOWER.
APPLICATION FILED OCT. 14, 1905.
3 SHEETS—SHEET 2.
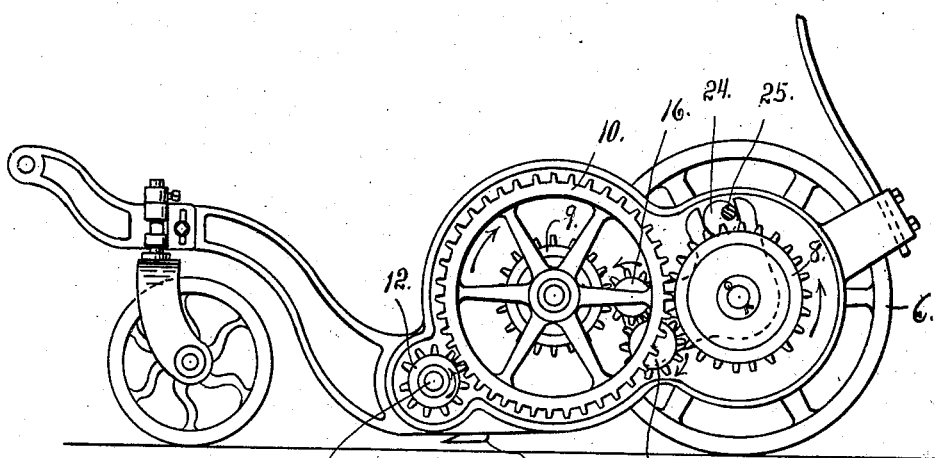
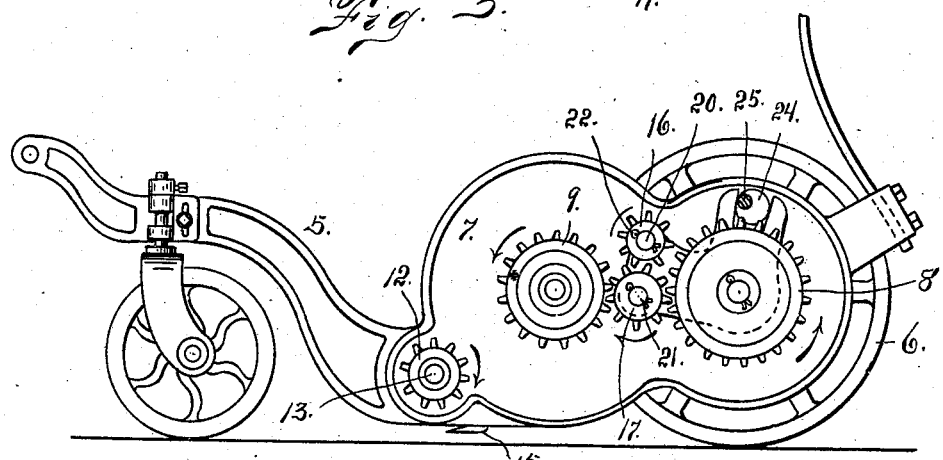
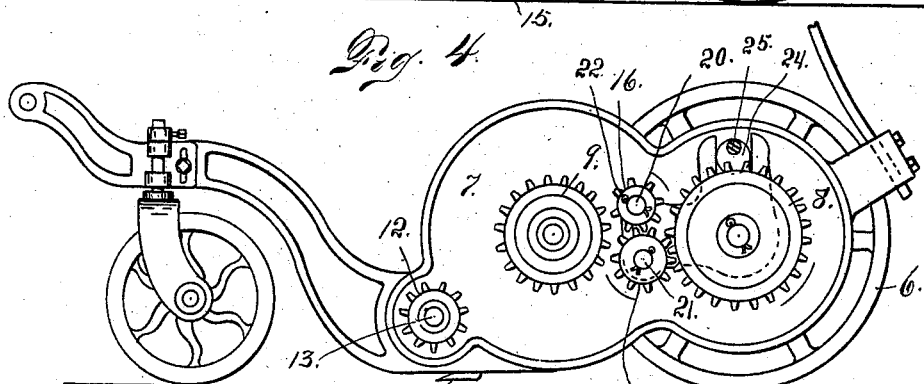
Witnesses
Otto E. Hoddick.
Dena Nelson.
Inventor
A. Hill
by
Attorney

UNITED STATES PATENT OFFICE.

ALFRED HILL, OF DENVER, COLORADO, ASSIGNOR TO THE KENDRICK AND HILL MANUFACTURING COMPANY, OF DENVER, COLORADO.

LAWN-MOWER.

No. 859,881.            Specification of Letters Patent.            Patented July 9, 1907.

Application filed October 14, 1905. Serial No. 282,834.

*To all whom it may concern:*

Be it known that I, ALFRED HILL, a citizen of the United States, residing in the city and county of Denver and State of Colorado, have invented certain new and useful Improvements in Lawn-Mowers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in lawn mowers of the class adapted to be drawn by a horse or moved by other power.

My object is to provide means for reversing the movement of the rotary cutter resulting from the travel of the ground wheels in the forward direction, for the purpose of sharpening the rotary cutter upon the cutter bar whenever this may become necessary.

In order to accomplish this function, I interpose between the regular gear on the ground wheel shaft and the gear immediately forward thereof, two auxiliary meshing gears mounted to be shifted, one of which is always in engagement with the gear on the ground wheel. These two auxiliary gears are so mounted that either may be made to mesh with the forward gear. When one gear is in mesh with the forward gear the rotary cutter is actuated for cutting grass, while when the other gear is thrown into mesh with the forward gear, the movement of the rotary cutter is reversed for sharpening purposes. The auxiliary gears are also capable of another adjustment whereby neither one of them meshes with the forward gear. In this event the machine is in position for transportation from place to place, permitting the free movement of the ground wheels without imparting movement to the rotary cutter through the train of gears.

In my improved construction the adjustment of the auxiliary gears is effected from the outside of the machine through the instrumentality of suitable mechanism located preferably in such position as to be within easy reach of the foot of the driver who occupies a seat upon the machine.

Having briefly outlined my improved construction as well as the function it is intended to perform, I will proceed to describe the same in detail reference being made to the accompanying drawing in which is illustrated an embodiment thereof.

Figure 7:
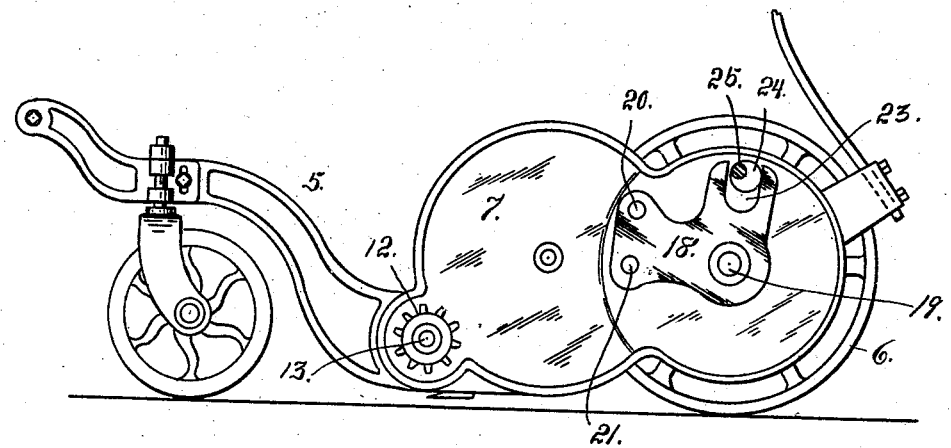

In this drawing, Figure 1 is a side elevation of a lawn mower equipped with my improvements. Fig. 2 is a fragmentary top plan view of the same. Fig. 3 is a side elevation showing one side of the gear case housing removed. Fig. 4 is a similar view showing the large forward gear removed and showing the auxiliary gears in position to impart a movement to the rotary cutter the reverse of that shown by the adjustment in Fig. 3. Fig. 5 is a view similar to Fig. 4 but showing the auxiliary gears in a different position, that is to say with neither in mesh with the forward gear. Fig. 6 is a view similar to Fig. 3 but with the large forward gear removed. This view is the same as Fig. 4 except that the auxiliary gears are in a different position. Fig. 7 is a side elevation of the machine with one side of the housing removed and with all of the gears removed except that on the shaft of the rotary cutter. Fig. 8 is a fragmentary detail view illustrating the means for actuating the eccentric cam, the parts being shown on a larger scale than in the other views.

The same reference characters indicate the same parts in all the views.

Let the numeral 5 designate a suitable frame work which is the same in all essential features as ordinarily employed in a well known make of mowers of this class. In this frame work is journaled a rearwardly located wheel or roller 6. This element it is believed may be more properly termed a roller since in horse machines this element is sometimes four feet long and really constitutes a roller. Upon one side of the machine is mounted a housing 7 in which are inclosed the operating gears 8, 9, 10 and 12. These gears are the same as in machines of ordinary construction but in the ordinary machine the gear 8 meshes directly with the gear 9. The large gear 10 meshes with the gear 12 on the shaft 13 of the rotary cutter 14, the latter being of ordinary construction. The stationary cutter bar 15 is also of the same construction as in ordinary machines.

In my improved machine I employ two auxiliary gears 16 and 17, the said gears being mounted upon a plate 18 having the form and action of a bell crank lever, the same being fulcrumed on a journal 19 of the ground roller 6. The gears 16 and 17 are mounted on the journals or wrist pins 20 and 21 of the plate 18 upon which the gears are held in place in any suitable manner as by cotter pins 22. These gears are mounted upon one arm of the bell crank lever-like plate, while in the opposite arm is formed a slot 23 in which is located an eccentric cam 24 mounted on a spindle 25 which protrudes beyond the housing 7 on the gearing side of the machine and is provided with an angle-shaped arm 26 located in such proximity to the seat 27 as to enable the same to be easily adjusted by the foot of the driver. This spindle 25 is also provided with a tubular part 28 in which is located a spring-pressed dog 29 held in place by a pin 30 passed through the sleeve 28 and engaging an elongated opening 31 in the pin. The pin is actuated by a coil spring 32 (see Fig. 8).

From the foregoing description the use and operation of my improved device will be readily understood. When it is desired to cut grass, the lever-like plate 18 together with the gears 16 and 17, is thrown to the position shown in Figs. 3 and 6, by the movement of the spindle carrying the eccentric cam 24, whereby the auxiliary gear 16 is made to mesh with the gear 9. When the said gears are in this position the arm 26 is thrown to the position indicated at A in Fig. 1. The direction of the individual gears of the entire train, is indicated by arrows in Fig. 3. Now when it is desired to sharpen the rotary cutter 14, the arm 26 is shifted to the dotted line position indicated at B in Fig. 1, whereby the auxiliary gears 16 and 17 are thrown to the position shown in Fig. 4, whereby the gear 16 is disengaged from the gear 9 while the gear 17 is thrown into mesh therewith. When the parts are in this position the direction of rotation of the train of gears is indicated by arrows in Fig. 4.

It will be understood that the direction of rotation of the rotary cutter is reversed whereby its blades are made to engage the stationary cutter bar 15 in such a manner as to sharpen the knives. Oil and emery or other suitable abrading material may be applied to the cutter bar to facilitate the sharpening operation.

When it is not desired that the cutter bar shall rotate, or in other words when moving the machine from place to place, the lever-like plate 18 is thrown to the position indicated in Fig. 5 whereby neither of the gears 16 and 17, engages the gear 9. This allows the ground roller freedom of movement without operating the gears 9, 10 and 12.

It will be understood that when the machine is in motion for grass cutting purposes, the gear 8 meshing with the gear 17 actuates the same, while the gear 17 actuates the gear 16, and the latter imparts rotary movement to the gears 9 and 10. The gear 10 meshing with the gear 12 imparts rotary movement to the cutter 14 in a manner that will be readily understood.

Attention is called to the fact that the gears 8 and 10 occupy different vertical planes, the gear 10 being farther out than the gear 8. Hence the gears 8 and 10 do not mesh with each other.

The object of the spring-pressed dog or pin 29, is to maintain the angle-shaped arm 26 in place when adjusted to occupy the position shown by full lines in Figs. 1 and 2. It must be understood that when in this position the auxiliary gears 16 and 17 are in the position shown in Fig. 5, that is to say with neither of the auxiliary gears in mesh with the gear 9. When in this position no movement is imparted to the rotary cutter during the travel of the machine. In other words the gears are adjusted to allow the rotary cutter to remain stationary while the machine is traveling from place to place when not in use. When the angle arm 26 is in this position it might possibly change its position due to the vibration of the machine, if some means were not employed to retain it in position. The spring-pressed dog 29 engages a recess C (see Fig. 2) formed in a part of the housing. This recess is of sufficient depth to maintain the angle arm in the desired position. At the same time the position of the arm may be changed to either the A or B position, (see Figs. 1 and 2) by the pressure of the foot of the driver.

It may be stated that the spindle 25 is provided at its inner extremity with a reduced threaded portion passing through a plain opening in the inner wall of the housing 7 and held in place by nuts D applied to the inwardly protruding extremity of the reduced threaded part.

Having thus described my invention, what I claim is:

1. In a mower of the class described, the combination with the ground wheel or roller, the rotary cutter, and a gearing connection between the ground wheel and cutter, including two auxiliary gears interposed between a gear on the ground wheel, and a second gear, the auxiliary gears being in mesh with each other and one of them being constantly in mesh with the ground wheel gear, the auxiliary gears being capable of such adjustment that either may be made to mesh with the second gear, whereby the rotary cutter may be made to rotate in one direction or the other as desired, a lever-like device upon one arm of which the auxiliary gears are mounted, and a fulcrum for said device, said fulcrum being in axial alinement with the axis of the ground wheel or roller the machine being also provided with a stationary cutter bar coöperating with the rotary cutter for grass cutting or sharpening purposes according to the direction of rotation.

2. In a mower of the class described, the combination with a ground wheel or roller, a rotary cutter and a cutter bar coöperating with the rotary cutter, a gear mounted to turn with the ground wheel, and a forward gear for imparting movement to the rotary cutter, of two auxiliary meshing gears interposed between the ground wheel gear and the forward gear, a lever-like device upon one arm of which the auxiliary gears are mounted, the fulcrum of the said device being in alinement with the axis of the ground wheel or roller one of the auxiliary gears being constantly in mesh with the ground wheel gear, the two gears being capable of such adjustment that either may be made to mesh with the forward gear or both disengaged therefrom as may be desired, the gearing arrangement being such that when one of the auxiliary gears is in mesh with the forward gear the rotary cutter is rotated in one direction, while when the other auxiliary gear is in mesh with the forward gear the rotary cutter is rotated in the reverse direction and when neither auxiliary gear meshes with the forward gear, the rotary cutter has no movement.

3. In a machine of the class described, the combination with a ground wheel or roller provided with a gear, and a rotary cutter provided with a gear, of a gearing connection between the ground wheel gear and the rotary cutter gear, said connection including two auxiliary gears, a lever like device upon which the two auxiliary gears are mounted, and having its fulcrum in axial alinement with the ground wheel or roller the lever-like device being capable of such adjustment as to change the position of the auxiliary gears whereby the rotary cutter may be caused to rotate in either direction or remain stationary as may be desired while the ground wheel is moving in a given direction.

4. In a machine of the class described, the combination with a ground wheel or roller provided with a gear, and a rotary cutter provided with a gear, of a gearing connection between the ground wheel gear and the rotary cutter gear, said gearing connection including a forward gear, a lever-like device having a fulcrum coinciding as to position with the axis of the ground wheel, two auxiliary gears mounted on the lever-like device, the auxiliary gears being arranged to mesh with each other and one of them being constantly in mesh with the ground wheel gear, and suitable means for adjusting the position of the lever-like device, whereby either of the auxiliary gears may be thrown into mesh with the forward gear or both auxiliary gears disengaged from the forward gear as may be desired.

5. In a machine of the class described, the combination of the ground wheel or roller, a rotary cutter and a gearing connection between the ground wheel and the said cutter including two auxiliary meshing gears, a bell crank lever device upon one arm of which said gears are mounted, and suitable means connected with the lever device for adjusting the auxiliary gears to cause the rotary cutter to move in either direction or remain stationary as may be desired.

6. In a machine of the class described, the combination of a ground wheel or roller, a rotary cutter, a gearing connection between the rotary cutter and ground wheel including a pair of auxiliary meshing gears, a bell crank lever device upon one arm of which the said gears are journaled, the other arm of the lever device being slotted, an eccentric cam engaging the slot of the lever whereby the latter may be actuated to move the auxiliary gears into position to cause the rotary cutter to rotate in either direction or remain stationary during a given movement of the ground wheel, and suitable means for actuating the eccentric cam to produce the aforesaid result.

In testimony whereof I affix my signature in presence of two witnesses.

ALFRED HILL.

Witnesses:
   DENA NELSON,
   A. J. O'BRIEN.